United States Patent [19]

Gildea et al.

[11] Patent Number: 5,345,244
[45] Date of Patent: Sep. 6, 1994

[54] CORDLESS SPS SMART ANTENNA DEVICE

[75] Inventors: David R. Gildea, Menlo Park; Charles Trimble, Los Altos Hills, both of Calif.

[73] Assignee: Trimble Navigation Limited, Sunnyvale, Calif.

[21] Appl. No.: 3,135

[22] Filed: Jan. 12, 1993

[51] Int. Cl.$^5$ .......................... G01S 5/02; H04B 7/15; H04B 1/38

[52] U.S. Cl. ..................... 342/357; 342/450; 455/11.1; 455/20; 455/89

[58] Field of Search ............... 342/352, 357, 58, 450, 342/457, 453; 455/7, 11.1, 89, 20

[56] References Cited

U.S. PATENT DOCUMENTS

| | | | |
|---|---|---|---|
| 3,711,856 | 1/1973 | Adrian et al. | 455/20 |
| 4,622,557 | 11/1986 | Westerfield | 342/357 |
| 5,043,736 | 8/1991 | Darnell et al. | 342/357 |

*Primary Examiner*—Gregory C. Issing
*Attorney, Agent, or Firm*—John Schipper

[57] ABSTRACT

Cordless antenna apparatus for determination of the location of an observer and/or of the time of observation by use of a Satellite Positioning System (SPS), such as the Global Positioning System or the Global Orbiting Navigational Satellite System. In each embodiment, the apparatus includes a Smart Antenna device and a display unit, connected by a wireless link. In a first embodiment, the Smart Antenna device includes: an SPS antenna to receive the SPS signals; an SPS signal frequency downconverter; an SPS signal processor to receive antenna output signals and to determine at least one of the present location of the SPS antenna or the time of observation; a transmitter to receive processor output signals and transmit these signals to the display unit; and a power supply. The display unit in the first embodiment includes: a receiver to receive the signals transmitted by the SPS Smart Antenna device transmitter; a display processor to receive output signals from the receiver and to process these signals for display of location or time information; display means to visibly or audibly display the location or time information; and a second power supply. In a second embodiment, the SPS signal processor is moved to the display unit. The transmitter and receiver may be replaced by two transceivers to allow the display unit to transmit messages, such as requests for information, to the SPS Smart Antenna device.

33 Claims, 2 Drawing Sheets

CORDLESS SPS SMART ANTENNA DEVICE

FIELD OF THE INVENTION

This invention relates to antennas for Satellite Positioning System receivers.

BACKGROUND OF THE INVENTION

Satellite Positioning System (SPS) receivers, such as receivers for the Global Positioning System and for the Global Orbiting Navigational System discussed below, are now used for many applications requiring determination of the observer's location anywhere on or in the vicinity of the Earth.

An SPS receiver includes an SPS antenna to receive the SPS signals transmitted from one or more SPS satellites, an SPS processor to calculate the SPS antenna's position and time of observation of that position from the SPS signals, a display processor to convert the SPS position and observation time into information that is useful for an application, and a display to show the information to the user. The SPS antenna must be positioned with a direct line of sight to the SPS satellite or satellites from which the receiver receives SPS signals.

Current SPS receivers adopt one of two formats. The first format, commonly called "handheld," includes an SPS antenna, an SPS processor, a display processor, and a display in a single unit. A problem with this format is that the user must remain in the open to preserve a direct line of sight from the SPS antenna to one or more SPS satellites while operating and observing the user's display.

The second format places the SPS antenna in an antenna unit and the display in a separate display unit. The SPS processor and the display processor may be contained in the antenna unit, in the display unit, or in a separate unit or units. In this second format, a cable is used to connect the GPS antenna unit to the display unit, and to any unit(s) containing the SPS processor and the display processor. This format allows the user to separate the SPS antenna and the display so that the SPS position and time information can be observed and operated upon in a protected environment. However, the cable and its connections are inconvenient to use when an observer moves around within a region. Further, the cable and its connections are expensive and prone to breakage or malfunction.

Workers in other technical areas have developed some technology that is relevant here. Yokoyama et al, in U.S. Pat. No. 4,641,366, disclose use of portable radio (handset) apparatus, including first and second antennas recessed into one side of the portable radio and capable of receiving signals in two separate frequency bands to which the radio responds. The radio apparatus includes one or two frequency converters to convert between audio and rf frequencies.

A small, handheld antenna is disclosed in U.S. Pat. No. 4,701,763, issued to Yamamoto et al. FIG. 14 of this patent illustrates application of this antenna concept to an rf signal receiver or transmitter. The high gain antenna is small enough to be insertable into many types of signal-receiving electronics devices, such as pagers. Most of this disclosure is concerned with the three-layer structure of the antenna.

Fowler, in U.S. Pat. No. 4,754,283, discloses a cordless GPS sounding device using two antennas, a first antenna to receive radiowaves from an antenna carried by a balloon aloft that indicates wind direction and velocity, and a second antenna to receive conventional GPS signals from a GPS satellite. The ground-based GPS signal receiver and antenna are connected by cables or wires to the balloon-sensing antenna and to a computer for determining wind direction and velocity as the balloon drifts relative to the receiver Blaese discloses a portable antenna suitable for mounting on a motor vehicle's side window, in U.S. Pat. No. 4,804,969. The mounting means facilitates easy installation and removal. The antenna apparatus includes a pivotable or fold-out, current feed line radiator, which is mounted on the outside surface of the window and is electrically attached to other portions of the antenna electronics located on the inside surface of the window. A coaxial cable connects the inside surface electronics to a separate transceiver located inside the vehicle. The line radiator includes a ⅝ wavelength radiator, stacked on a helical separation coil, stacked on a ⅜ wavelength radiator, for field cancellation purposes. Blaese discloses a cordless, easy-mount antenna of similar design that obviates the need for the coaxial cable, in U.S. Pat. No. 5,059,971; a second line radiator provides a wireless link with the transceiver.

A very thin radio housing having a printed circuit loop antenna mounted in a plane on an interior wall of the housing is disclosed by Urbish et al in U.S. Pat. No. 4,894,663. The housing opens as a notebook would open, to disclose the antenna and a portion of the antenna electronics, and a portion of the antenna circuit is located on a hinge that facilitates opening and closing the housing. The integrated antenna, electronics and housing is intended to serve as a credit card size page signal receiver or other signal receiving system.

Newland discloses a small antenna for a cordless telephone in U.S. Pat. No. 4,897,863. The tip-and-ring wiring in the associated telephone handset serves as the antenna, which provides telecommunication capability with the :rest of the world through a wireless link to inside telephone wiring in an adjacent structure, such as a home. The tip-and-ting wiring thus serves as both a signal feed line and as an antenna. Audio and radio frequency signals can be transmitted and received using this antenna.

Mori et al, in U.S. Pat. No. 4,935,745, disclose a credit card size radio receiver with a slot antenna integrated as part of the receiver housing. Three contiguous sides of the card size housing together serve as the antenna. An rf frequency circuit (not shown) receives and processes the incoming radio signals and is carried by the housing. The apparatus is intended to serve as a card size page signal receiver.

U.S. Pat. No. 5,052,645, issued to Hixon, discloses a telescoping pole antenna that can be used to support a GPS signal antenna. The pole includes many concentric telescoping, vertically oriented cylinders that can be collapsed to one meter in height or extended to a height of as much as 20 meters. The antenna and telescoping support pole combination is not portable and would probably have a mass of several tens of kilograms.

A credit card size radio page signal receiver, with a portion of the receiver housing serving as an antenna, is disclosed in U.S. Pat. No. 5,054,120, issued to Ushiyama et al. Top and bottom walls of the housing serve as part of a loop antenna that can handle VHF signals. The antenna is not defined by any particular circuit integrated with the housing.

Raubenheimer et al disclose a handheld navigational aid, including a keyboard for data entry, a visual display and a loudspeaker for audible communication, in U.S. Pat. No. 5,059,970. The visual display presents a small map of a chosen region, and the map provides two cursors to indicate and determine the distance between two points on the map. An icon indicates the position of a chosen marine or airborne vessel on the map, and present position relative to a fixed reference point is visually displayed as distance/bearing or as latitude/longitude coordinates in a two-dimensional representation. The apparatus contains a microprocessor and stored-on-board algorithms and mathematical equations for signal processing purposes and relies upon a resettable internal clock for certain display purposes. Input signals appear to be entered through the keyboard.

What is needed is "cordless" SPS apparatus that allows the user: to place the SPS antenna in a direct line of sight from one or more SPS satellites; to operate and observe the position and/or observation time display in a protected environment; and to allow the user and display unit to move around without the inconvenience and poor reliability associated with use of a cable.

SUMMARY OF THE INVENTION

These needs are met by the invention, which provides an apparatus including: an SPS antenna, positioned to receive SPS signals from one or more SPS satellites, with each signal being characteristic of a particular satellite source; a downconverter to downconvert the primary frequency of the SPS signals to a selected lower frequency; a SPS signal processor to determine the present position and observation time for the SPS antenna; a display processor to operate application software; a visual display; and a short link wireless communication link to electrically connect the unit containing the SPS antenna to the display unit.

In a first embodiment, a first antenna unit, referred to herein as a SPS Smart Antenna device, contains an SPS antenna, an SPS signal processor and its associated memory, a power supply, and a transceiver. A separate display unit contains a transceiver, a display processor and its associated memory and a display.

A second embodiment of a Smart Antenna device contains an SPS antenna, a frequency translator, a power supply, and. a transmitter. The frequency translator converts the SPS signal frequency to another frequency that is suitable for transmission over a wireless system translator without changing the signal modulation characteristics. A separate display unit contains an SPS signal receiver, a frequency converter, an SPS signal processor and its associated memory, a display processor and its associated memory, and a display.

Each of these embodiments allows the antenna unit containing the SPS antenna to be placed with a direct line of sight to one or more SPS satellites, while the display unit can be carried by the user anywhere within a region determined by the ability of the display unit to receive wireless communications from the antenna unit. The distance from the antenna unit to the display unit can range from less than 1 meter to a few hundred meters, depending upon the short link carrier frequency, transmit power, receive sensitivity, signal modulation and the local terrain.

DETAILED DESCRIPTION OF THE INVENTION

Figure 1:
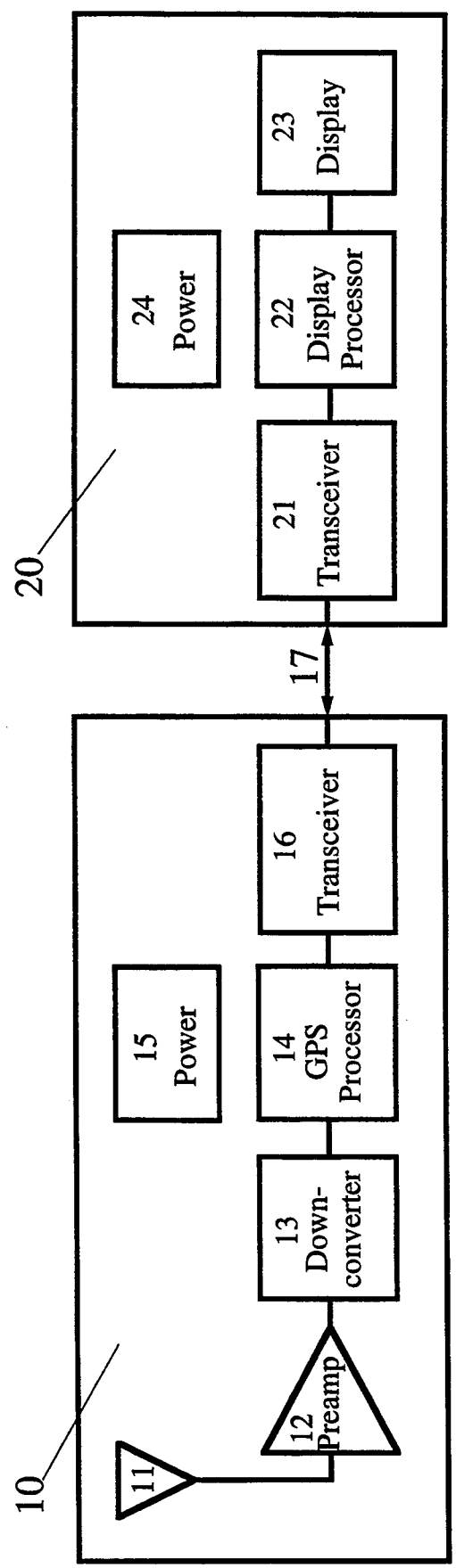
FIGS. 1 and 2 are schematic views of first and second embodiments of the invention.

FIG. 1 illustrates a first embodiment of the invention, including an SPS Smart Antenna device 10, which may take the form of a module of convenient size and shape such as 5–13 cm across and 1–10 cm high. The device 10 includes an SPS signal antenna 11, whose antenna output signals are amplified by a preamplifier 12 (optional). The antenna output signals are received by a frequency downconverter 13, whose output signals are received and processed by an SPS signal processor 14 and associated memory. A wireless transceiver 16 receives input signals from the SPS processor and transmits these signals through a wireless link 17 to another electronic device 20. The transceiver 16 also receives input signals from the electronic device 20 and passes these input signals to the SPS signal processor 14. A power supply 15 provides operating power for the SPS antenna 11, the preamplifier 12, the downconverter 13, the SPS signal processor 14, the wireless transceiver 16 and/or the wireless link 17.

The electronic device 20 is a display unit and includes a wireless transceiver 21, that receives and transmits signals through the wireless link 17 to the SPS Smart Antenna device 10. The transceiver 21 feeds output signals to, and receives input signals from, a display processor 22 and associated memory, that is programmed to display application information. A display 23 receives input signals from the display processor and visually and/or audibly displays antenna location and observation time. Location can be displayed visually as longitude, latitude and elevation coordinates or in terms of coordinates referenced to local monuments such as state plane, or other reference systems such as Universal Transverse Mercator, Military Grid Reference System, Universal Polar Stereographic, Ordinance Survey of Great Britain and GPS Cartesian Coordinates.

Location can also be displayed or presented audibly, for example, by incorporating a simple speech synthesis module and loudspeaker that receives location and/or time information from the display processor 22 and presents this to the user as audibly perceptible information.

A power supply 24 provides operating power for the transceiver 21, the display processor 22 and/or the display 23. The power supply 15 and/or 24 contained in the SPS Smart Antenna device 10 and/or in the display unit 20 may contain rechargeable or non-rechargeable batteries.

Each of the wireless transceivers 16 and 21 includes all apparatus required to transmit and receive signals over a shortlink wireless system including hardware for an antenna, transmitters, amplifiers, modulators, demodulators, parallel-to-serial converter, clock, recovery, carrier recovery, and software for data buffers, channel selection, user identification, user discrimination, error detection and/or correction, retransmission, and interfacing. The display unit 20, may be the combination of a general purpose computer, programmed for applications of SPS, and the transceiver 21. Alternatively, the display unit 20 may be specifically designed for marine, aviation, terrestrial navigation, applications for navigation, tracking, map making, surveying, event marking, or any other field in which SPS location is applied.

Alternatively, the wireless transceiver 16 may be replaced by a transmitter that receives input signals from the SPS processor 14 and that may transmit but not receive signals through the wireless link 17 to the display unit 20; the wireless transceiver 21 may be replaced by a receiver that receives input signals from, but does not transmit signals to, the SPS Smart Antenna device 10; and this receiver may issue signals to, but not receive signals from, the display processor 22.

The wireless link may operate at any suitable frequency, including radiowave with transmit and receive antennas, infrared or visible range with light and light detection devices, or acoustic with speaker and microphone devices, and may use any type of modulation. including those in which the frequency, amplitude, or phase of the carrier signal is modulated.

Figure 2:
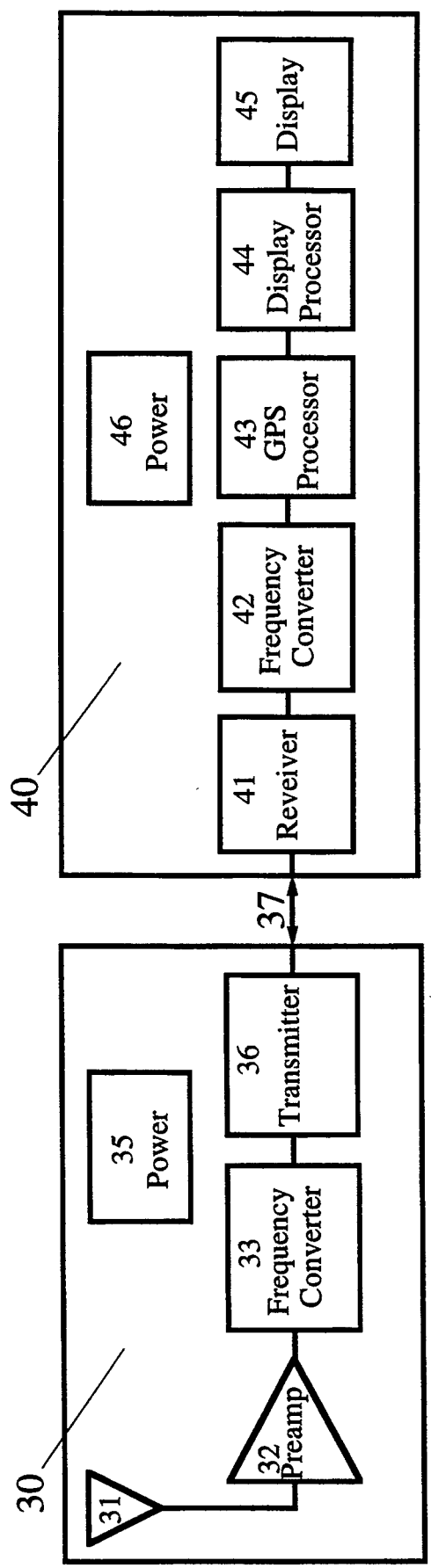

FIG. 2 illustrates a second embodiment of the invention, which includes a second version of an SPS Smart Antenna device 30 that contains an SPS signal antenna 31, whose antenna output signals are amplified by a preamplifier 32 (optional). The SPS antenna output signals are received by a frequency translator 33, that converts the SPS primary signal frequency to a frequency suitable for transmission without changing the SPS signal modulation characteristics. The translator output signals are received by a transmitter 36, that transmits these signals through a wireless link 37 to a display unit 40. The Smart Antenna device 30 also contains a power supply 35 to supply operating power for the SPS antenna 31, the preamplifier 32, the frequency translator 33, the transmitter 36 and/or the wireless link 37.

The display unit 40 includes a receiver 41 that receives signals from the Smart Antenna device 30 through the wireless link 37. The output signals from the receiver 41 are received by a frequency translator 42 that converts the received signals to a frequency suitable for signal processing. The output signals from the frequency translator 42 are received by an SPS signal processor 43 and associated memory that determines the present location of the antenna unit 30 and/or the time of observation of the present location. The output signals from the processor 43 are received by a display processor 44 and associated memory, which is programmed to prepare the location and/or time information for visual and/or audible display. The output signals from the display processor are received by a display 45 that displays the location and/or observation time. Location can be displayed visually as longitude, latitude and elevation coordinates or in terms of coordinates referenced to local location monuments. Location can also be displayed audibly, as discussed in connection with the first embodiment of FIG. 1.

The display unit 40 also contains a power supply 46 to supply operating power for the receiver 41, the frequency translator 42, the GPS signal processor 43, the display processor 44 and/or the display 45. The power supply for the antenna unit 30 and/or the display unit 40 may contain rechargeable or non-rechargeable batteries.

The display unit 40 may be a general purpose computer, programmed for applications of GPS with the addition of the receiver 41. Alternatively, a display unit may be specifically designed for marine, aviation, or terrestrial applications for navigation, tracking, map making, surveying, event marking, or any other field in which GPS location is applied.

A Satellite Positioning System (SPS) is a system of satellite signal transmitters, with receivers located on the Earth's surface or adjacent to the Earth's surface, that transmits information from which an observer's present location and/or the time of observation can be determined. Two operational systems, each of which qualifies as an SPS, are the Global Positioning System and the Global Orbiting Navigational System.

The Global Positioning System (GPS) is part of a satellite-based navigation system developed by the United States Defense Department under its NAVSTAR program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two L-band carrier signals: an L1 signal having a frequency $f1 = 1575.42$ MHz and an L2 signal having a frequency $f2 = 1227.6$ MHz. These two frequencies are integral multiples $f1 = 1500 f0$ and $f2 = 1200 f0$ of a base frequency $f0 = 1.023$ MHz. The L1 and L2 signals from each satellite are binary phase shift key (BPSK) modulated by predetermined pseudo random noise (PRN) codes that are different for each of the GPS satellites deployed. One motivation for use of two carrier signals L1 and L2 is to allow partial compensation for propagation delay of such a signal through the ionosphere, which delay varies approximately as the inverse square of signal frequency f (delay $\alpha$ $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are stored in GPS satellite signal receivers carried by ground observers. A first PRN code for each GPS satellite, sometimes referred to as a precision code or P-code, is a relatively long, fine-grained code having an associated clock rate of $10 f0 = 10.23$ MHz. A second PRN code for each GPS satellite, sometimes referred to as a clear/acquisition code or C/A code, is intended to facilitate rapid satellite signal acquisition and is a relatively short, coarser-grained code having a clock rate of $f0 = 1.023$ MHz. The C/A code for any GPS satellite has a length of 1023 chips or time increments before this code repeats. The P-code for any GPS satellite has a length of precisely one week (7.000 days) before this code repeats. The GPS satellite bit stream includes information on the ephemeris of each GPS satellite, parameters identifying the particular GPS satellite, and corrections for ionospheric signal propagation delays.

A useful discussion of the GPS and techniques for obtaining position information from the satellite signals is found in Guide To GPS Positioning, edited by David Wells, Canadian GPS Associates, 1986.

A second configuration for global positioning is the Global Orbiting Navigation Satellite System (GLONASS), placed in orbit by the former Soviet Union. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1 = (1.602 + 9k/16)$ MHz and $t2 = (1,246 + 7k/16)$ MHz, where k (=0, 1, 2, . . . , 23) is the channel or satellite number. Because the channel frequencies are distinguishable from each other, the P-code, and also the C/A code, is the same for each satellite.

Reference to a Satellite Positioning System or SPS herein refers to a Global Positioning System, to a Global Orbiting Navigation System, and to any other compatible satellite-based system that provides information by which an observer's position and/or the time of observation can be determined.

What is claimed is:

1. Apparatus for determination of the location of an observer or the time of observation by use of a Satellite Positioning System (SPS), the apparatus comprising:

an antenna module, having a diameter in any plane parallel to a selected plane no greater than 13 cm and having a height measured perpendicular to the selected plane no greater than 10 cm, the module comprising:

an SPS antenna positioned to receive SPS signals from one or more SPS satellites, where each satellite issues a distinct SPS signal, and to issue an antenna output signal;

a frequency downconverter to receive the antenna output signal and to issue this signal as an output signal at a selected lower frequency;

an SPS signal processor to receive the downconverter output signal, to process this signal to determine at least one of the present location of the SPS antenna or the present time of observation of a satellite by the antenna, and to issue information on the present location or the present time of observation as an output signal;

a transmitter to transmit the output signal from the SPS signal processor to a selected receiver; and a first power supply, positioned to supply operating power to at least one of the SPS antenna, the downconverter, the SPS signal processor and the transmitter;

a display module, having a diameter in any plane parallel to a second selected plane no greater than 13 cm and having a height measured perpendicular to the second selected plane no greater than 10 cm, the module comprising:

a receiver positioned to receive the SPS signal processor output signal from the transmitter, where the receiver issues any signal it receives from the transmitter as a receiver output signal;

a display processor to receive the receiver output signal, to process this signal for display of information contained in the signal received, and to issue the processed signal as an output signal;

display means for receiving the display processor output signal and visually or audibly displaying at least one of the present location of the SPS antenna and the present time of observation by the antenna; and a second power supply, positioned to supply operating power to at least one of the receiver, the display processor and the display means; and a wireless link connecting the transmitter and the receiver, where the antenna module and the display module are spaced apart by a distance that is no more than approximately 300 meters.

2. The apparatus of claim 1, wherein said wireless link operates with a carrier signal frequency in the range $10^8$ Hz–$10^{15}$ Hz.

3. The apparatus of claim 1 wherein said wireless link operates in the infrared or visible light frequency range.

4. The apparatus of claim 1 wherein said wireless link operates in the radio frequency range.

5. The apparatus of claim 1, wherein said wireless link operates in the acoustic or audible range of carrier frequencies.

6. The apparatus of claim 1, wherein said display includes a digital computer.

7. The apparatus of claim 1, wherein said display includes a navigation instrument.

8. The apparatus of claim 1, wherein said display displays a map of the local region.

9. The apparatus of claim 8, wherein said display also displays said present location of said antenna on said map.

10. The apparatus of claim 8, wherein said display includes an instrument for adding, modifying or deleting attributes on said map.

11. The apparatus of claim 1, wherein said includes an instrument for visually indicating the SPS-determined location or time of a selected event.

12. The apparatus of claim 1, wherein said display includes an instrument for SPS surveying.

13. The apparatus of claim 1, wherein said display means displays the coordinates of said present location of said SPS antenna.

14. The apparatus of claim 1, wherein said display means includes means for audibly presenting the SPS-determined location or time of a selected event.

15. The apparatus of claim 1, wherein said transmitter is a first transceiver, said receiver is a second transceiver, and the second transceiver may transmit signals over said wireless link that are received by the first transceiver.

16. The apparatus of claim 1, wherein said Satellite Positioning System is a Global Positioning System (GPS).

17. The apparatus of claim 1, wherein said Satellite Positioning System is a Global Orbiting Navigation Satellite System (GLONASS).

18. Apparatus for determination of the location of an observer or the time of observation by use of a Satellite Positioning System (SPS), the apparatus comprising:

an antenna module, having a diameter in any plane parallel to a selected plane no greater than 13 cm and having a height measured perpendicular to the selected plane no greater than 10 cm, the module comprising:

an SPS antenna positioned to receive SPS signals from one or more SPS satellites, where each satellite issues a distinct SPS signal, and to issue an antenna output signal;

a first frequency translator to receive the antenna output signal and to issue this signal as an output signal at a first selected frequency;

a transmitter to receive the output signal from the first frequency translator and to transmit this signal to a selected receiver; and a first power supply, positioned to supply operating power to at least one of the SPS antenna, the first frequency converter and the transmitter;

a display module, having a diameter in any plane parallel to a selected plane no greater than 13 cm and having a height measured perpendicular to the selected plane no greater than 10 cm, the module comprising:

a receiver positioned to receive the first frequency translator output signal from the transmitter, where the receiver issues any signal it receives from the transmitter as an output signal;

a second frequency translator to receive the receiver output signal and to issue this signal as an output signal at a second selected frequency;

an SPS signal processor to receive the second frequency converter output signal, to process this signal to determine at least one of the present location of the SPS antenna or the present time of observation of a satellite by the antenna, and to issue information on the present location or the present time of observation as an output signal;

a display processor to receive the SPS signal processor output signal, to process this signal for display of information contained in the signal received, and to issue the processed signal as an output signal;

display means for receiving the display processor output signal and displaying at least one of the coordinates of the present location of the SPS antenna or the present time of observation by the antenna; and a second power supply, positioned to supply operating power to at least one of the receiver, the second frequency converter, the SPS signal processor, the display processor and the display means; and a wireless link connecting the transmitter and the receiver, where the antenna and the display module are spaced apart by a distance that is no more than approximately 300 meters.

19. The apparatus of claim 18, wherein said wireless link operates with a carrier signal frequency in the range $10^8$ Hz–$10^{15}$ Hz.

20. The apparatus of claim 18, wherein said wireless link operates in the infrared or visible light frequency range.

21. The apparatus of claim 18, wherein said wireless link operates in the radio frequency range.

22. The apparatus of claim 18, wherein said wireless link operates in the acoustic or audible range of carrier frequencies.

23. The apparatus of claim 18, wherein said display processor includes a digital computer.

24. The apparatus of claim 23, wherein said display is a navigation instrument.

25. The apparatus of claim 23, wherein said display displays a map.

26. The apparatus of claim 25, wherein said display is an instrument for adding, modifying or deleting attributes on said map.

27. The apparatus of claim 18, wherein said is an instrument for marking the SPS location and time of an event.

28. The apparatus of claim 18, wherein said is an instrument for SPS surveying.

29. The apparatus of claim 18, wherein said display means displays the coordinates of said present location of said SPS antenna.

30. The apparatus of claim 18, wherein said display means displays a map that indicates said present location of said SPS antenna.

31. The apparatus of claim 18, wherein said display means includes means for audibly presenting the SPS-determined location or time of a selected event.

32. The apparatus of claim 18, wherein said Satellite Positioning System is a Global Positioning System (GPS).

33. The apparatus of claim 18, wherein said Satellite Positioning System is a Global Orbiting Navigation Satellite System (GLONASS).

* * * * *